United States Patent Office 3,513,207
Patented May 19, 1970

3,513,207
PROCESS FOR PREPARING ALLYL CHLORIDE AND ITS MONOMETHYL-SUBSTITUTION PRODUCTS
Lothar Hornig, Wilhelm Lendle, Gunther Mau, and Heinz Schmitz, Frankfurt am Main, Germany, assignors to Farbwerke Hoechst Atkiengesellschaft vormals Meister Lucius & Bruning, Frankfurt am Main, Germany, a corporation of Germany
No Drawing. Filed June 1, 1965, Ser. No. 460,542
Claims priority, application Germany, June 6, 1964, F 43,107; Feb. 16, 1965, F 45,254
Int. Cl. C07c 21/00
U.S. Cl. 260—654                     6 Claims

ABSTRACT OF THE DISCLOSURE

Method of reacting oxygen with (1) a $C_3$–$C_4$ olefin and hydrogen chloride, and/or (2) a $C_3$–$C_4$ monochloroparaffin over an elemental noble metal catalyst to form allyl chloride and monomethyl substitution products thereof.

---

The present invention relates to a process for preparing allyl chloride and its monomethyl-substitution products.

It is known to react olefins directly with chlorine to yield compounds in which one or several carbon atoms directly adjacent to the carbon atoms of the double bond each carry a chlorine atom. Propylene, for example, reacts with chlorine at high temperature and with a short residence time to 3-chloro-propene-(1) (allyl chloride). When butene-(2) is used the chlorination reaction takes place at lower temperature and leads to the formation of 1-chloro-butene-(2) (crotyl chloride). Isobutene can be transformed at low temperatures and under the action of chlorine into 3-chloro-2-methyl-propene-(1) (methallyl chloride).

In the aforesaid chlorination processes, some of which are carried out on an industrial scale, such as the high temperature chlorination of propylene, one mol of chlorine ($Cl_2$) is used for one mol of olefin. Only one half of the chlorine is used up for the formation of the allyl chloride, while the other half forms hydrogen chloride as a by-product. As in many chlorination processes in this case, too, the economy of the process is impaired by the formation of hydrogen chloride.

A process for transforming an olefin into the corresponding allyl chloride avoiding the formation of hydrogen chloride as a by-product and utilizing readily-available hydrogen chloride and oxygen would represent a considerable advance in the art.

It has now been found that allyl chloride and monomethyl-substituted allyl chloride can advantageously be prepared by passing oxygen and (a) mixtures of olefins with 3 or 4 carbon atoms and hydrogen chloride or (b) monochloroparaffins with 3 or 4 carbon atoms or (c) mixtures of (a) and (b) over a catalyst containing at least one elementary noble metal of the eighth group of the Periodic Table according to Mendeleev.

Using olefins having one methyl group in α-position, the reaction of the olefin with oxygen and hydrogen chloride leads practically exclusively to the formation of the corresponding allyl chloride. Propylene and butene-(1) yield practically exclusively allyl chloride and 3-chlorobutene-(1), respectively. When olefins are used having two α-methyl groups in addition to the corresponding methyl-substituted allyl chlorides, dichloroolefins are obtained. From butene-(2) and isobutene, 1-chlorobutene-(2) (crotyl chloride) and 3-chloro-2-methylpropene-(1) (methallyl chloride) are respectively obtained as principal products and 1,4-dichlorobutene-(2) and 1,3-dichloro-2-methylene-propane, respectively, as by-products. The reaction is especially smooth with propylene and isobutylene. Therefore, these olefins are preferred as starting products.

When a monochloroparaffin is reacted with oxygen, allyl chloride (3-chloro-propylene-(1)) is obtained from 2-chloro-propane (isopropyl chloride) and 1-chloropropane (n-propyl chloride). Using 2-chloro-2-methyl-propane (tert.butyl chloride) and 1-chloro-2-methylpropane (isobutyl chloride), the reaction furnishes methallyl chloride (3-chloro-2-methylpropylene-(1)). With the use of 2-chlorobutane (sec.butyl chloride) and 1-chlorobutane (n-butylchloride), a small amount of crotyl chloride (1-chlorobutene-(2)) and 3-chlorobutene-(1) is obtained. In all cases the stoichiometric amounts of water are formed.

The secondary and tertiary monochloroparaffins (isopropyl chloride, tert.butyl chloride, sec.butyl chloride) are more readily oxidized, i.e. under milder conditions, to give the corresponding allyl chlorides (allyl chloride, methallylchloride, crotyl chloride) than the primary monochloroparaffins (n-propyl chloride, isobutyl chloride, n-butyl chloride). It is remarkable that isopropyl chloride reacts more readily than sec-butyl chloride, although both compounds contain the chlorine atom in secondary position, and that isopropyl chloride and tert.butyl chloride have about the same reactivity, although in the former compound the chlorine atom is a secondary one while in the latter compound it is a tertiary one.

Hence it follows that when monochloroparaffins are used as starting materials isopropyl chloride and tert.butyl chloride especially react smoothly to yield allyl chloride and methallyl chloride, respectively. Therefore, the two former compounds are preferred as starting products and the two latter compounds as reaction products.

Suitable catalysts are the elements rhodium, iridium, platinum, ruthenium and particularly palladium. It is likewise possible to use mixtures of the said metals. It is advantageous to support the catalysts on carrier materials, for example aluminum oxide, aluminum silicate, silica gel, pumice, asbestos, feldspar, zeolite or silicon carbide.

Suitable noble metals of Group VIII of the Periodic Table are platinum, ruthenium, rhodium, palladium, iridium, and preferably palladium. The noble metal catalysts are advantageously prepared by impregnating the carrier material with an aqueous solution of the noble metal compound, for example the chloride, and producing the elementary noble metal by treating the catalyst with a reducing agent, for example hydrogen or an alkaline hydrazine solution. In some cases the noble metal compound is reduced to the metal under the conditions of the reaction according to the invention. It is suitable to use catalysts containing 0.1 to 25% by weight of noble metal, calculated on the total weight of the catalyst. It is likewise possible, however, to carry out the reaction with a catalyst in which the concentration of the noble metal is outside the specified range, or with a catalyst which is not supported on a carrier material.

In general, the reaction according to the invention is carried out in a manner such that the starting components, hydrogen chloride, oxygen and olefin, or oxygen and monochloroparaffin, advantageously in admixture with one another, are passed over the catalyst. When the olefin or the monochloroparaffin is liquid under the reaction conditions or dissolved in a solvent, the mixture of oxygen and hydrogen chloride, on the one hand, and the liquid olefin, on the other, or the oxygen, on the one hand, and the liquid monochloroparaffin, on the other, are passed in countercurrent flow or in parallel flow over a fixed catalyst bed, this being a mixed phase reaction. Alternatively, the reaction can be carried out in a suspension of the catalyst in a liquid. In this case, too, the catalyst may contain a carrier material. The liquid used to suspend the catalyst can be the olefin or the monochloroparaffin itself or a solution thereof in a reaction inert solvent.

The starting components can likewise be used in admixture with gases and liquids inert to the reaction, for example low molecular weight hydrocarbons with 1 to 6 carbon atoms, nitrogen, noble gases, carbon dioxide, or hydrogen. The oxygen required for the reaction may be used in the form of air.

Liquid starting components can be used in admixture with solvents inert to the reaction, such as chlorinated hydrocarbons, for example chloroform, and saturated hydrocarbons, for example hexane, and benzene. Although the reaction is generally carried out in the absence of water, small amounts of water do not disturb.

The temperatures and pressures to be maintained are not critical. In order to obtain high conversions it is advantageous to work at high temperatures and high pressure. However, too high a temperature favors the formation of undesired by-products, above all oxidation products, while too high a pressure favors the formation of addition products of hydrogen chloride on the olefin, for example 2-chloropropane and 1-chloropropane with the use of propylene. It is, therefore, suitable to operate at a temperature in the range of from 20 to 350° C. and preferably 50 to 300° C. and under a pressure in the range of from 0.2 to 20 atmospheres, preferably 1 to 10 atmospheres. However, the reaction takes place even outside of the aforesaid ranges.

More particularly, the reaction is carried out in a manner such that a gas mixture containing the reaction components is passed through a tube filled with the catalyst, the gas mixture is condensed at the end of the reaction tube, the unreacted or formed monochloroparaffin is separated from the condensate and reconducted wholly or partially into the reaction tube together with the uncondensed portion of the reaction gas. In the preferred case of the preparation of allyl chloride from propylene or isopropyl chloride or of methallyl chloride from isobutylene or tert-butyl chloride, it is advantageous to cool the gas mixture at the end of the reaction zone to a temperature above the boiling point of the monochloroparaffin but below the boiling point of allyl chloride or methallyl chloride, respectively. Performing this partial condensation saves the costs involved in the condensation and vaporization of the unreacted or newly formed monochloroparaffin to be reconducted into the reaction zone.

It is advantageous but not necessary to select such a temperature and pressure that the monochloroparaffin is present in the gaseous state.

The reaction products are processed in the usual manner. After having left the reaction zone, the reaction mixture is cooled whereby the allyl chloride or its methyl-substitution product and the unreacted or newly formed monochloroparaffin are condensed. The condensate is preferably separated by distillation. In some cases, as already pointed out above, a partial condensation may be performed, whereby the allyl chloride is separated from the monochloroparaffin, which is then reconducted into the reaction zone.

Whether the olefin, hydrogen chloride, and oxygen, or the monochloroparaffin and oxygen starting components can be used in stoichiometric amounts depends on the explosion limits of the oxygenated gas mixtures in the reaction zone, prior to entering the reaction zone, and after leaving the reaction zone. In general, oxygen is used in an amount below the stoichiometric amount. The molar proportion of monochloroparaffin to oxygen is advantageously in the range of from 5 to 1, more advantageously 4 to 2. However, a ratio above 5 and below 1 may likewise be used. When an olefin, hydrogen chloride and oxygen are used as starting components, the molar amounts of the olefin and hydrogen chloride are suitably not too different, for example in the range of from 1:5 and 5:1, while the oxygen can be used in a lower deficiency or in a higher excess.

The process according to the invention differs from the known processes for the preparation of allyl chloride and its methyl-substitution products in that the olefin is reacted with hydrogen chloride and oxygen instead of with chlorine. Since the monochloroparaffins, especially the preferred isopropyl chloride and tert.butylchloride, are produced industrially from olefins and hydrogen chloride, in the variant of the process using monochloroparaffins and reacting them to obtain allyl chloride and its methyl-substitution products, the chlorine is likewise replaced by hydrogen chloride and oxygen.

The following examples serve to illustrate the invention but they are not intended to limit it thereto. The percentages are by volume unless otherwise stated.

EXAMPLE 1

200 milliliters of pumice (size 2 to 4 mm.) were impregnated with a solution of palladium-II-chloride in dilute hydrochloric acid. The palladium salt was reduced on the surface of the carrier material by heating with dilute hydrazine hydrate solution, the catalyst was washed and dried. 200 milliliters of the catalyst obtained contained 9.6 grams of metallic palladium.

The catalyst was filled into an electrically heated glass tube having a diameter of 25 millimeters and a length of 50 centimeters. At a temperature of 250° C. a mixture of 50% of propylene, 30% of hydrogen chloride and 20% of oxygen was passed through the tube at a rate of 14 liters per hour. At the issue from the tube the gas mixture was cooled in a water cooler. It contained 2% of allyl chloride and 0.4% by volume of isopropyl chloride. n-Propyl chloride and 2-chloropropene could not be detected.

EXAMPLE 2

200 milliliters of a feldspar (grain size 2–3 mm.) were impregnated with a solution of 12.2 grams of palladium chloride in dilute hydrochloric acid and dried. As described in Example 1, a mixture of propylene, hydrogen chloride and oxygen (50:30:20) was passed over the catalyst at a temperature of 230° C. in the reaction space. The mixture leaving the reaction zone contained 4.2% of allyl chloride and 0.7% of isopropyl chloride.

When operating in this manner, the palladium chloride was quantitatively reduced under the reaction conditions to metallic palladium.

EXAMPLE 3

200 milliliters of aluminum oxide ($\alpha$-$Al_2O_3$) in the form of tablets having a diameter of 4 mm. and a height of 4 mm. were impregnated with a solution of 20 grams of palladium-II-chloride in semi-concentrated hydrochloric acid. The mixture was evaporated in a rotary evaporator until it was dry and the dry material was treated with hydrogen at 100° C., whereby the salt was reduced to elementary palladium.

The catalyst thus obtained was filled into an U-shaped tube having a diameter of 20 mm. and standing in an oil bath of 200° C. A gas mixture was passed through at atmospheric pressure at a rate of 9.3 N liters of hydrogen chloride, 9.2 N liters of oxygen and 23.4 N liters of pro-propylene per hour.[1] The gas mixture leaving the reaction tube contained 1.2% of allyl chloride and less than 0.5% of isopropyl chloride.

EXAMPLE 4

250 cc. of silica gel of a medium grain size of 0.03 cc. and a solution of 15 grams of palladium-II-chloride in 250 milliliters of 4 N HCl were evaporated in a rotary evaporator until the mixture was dry. The dry material

[1] (N meaning under normal conditions of pressure and temperature, i.e. 0° C. and 760 mm. Hg.)

was treated with hydrogen at 90° C., whereby the palladium salt was reduced to the metal.

The catalyst thus obtained was filled into a tube having a diameter of 25 millimeters which was heated at 220° C. by external heating. At atmospheric pressure a mixture of 8 N liters of oxygen and 75 grams of vaporized isopropyl chloride was passed over the catalyst per hour. After having left the reaction tube the gas mixture was cooled. A condensate was obtained which contained, in addition to unreacted isopropyl chloride, 4.8 grams per hour of allyl chloride.

We claim:

1. A process for preparing allyl chloride or its monomethyl substitution products, respectively, which process comprises conducting oxygen and a secondary or tertiary monochloroparaffin having 3 to 4 carbon atoms, respectively, over at least one elemental noble metal selected from the group consisting of platinum, ruthenium, rhodium, palladium, and iridium as a catalyst at a temperature of from 50° C. to 350° C. and at a pressure of from 0.2 to 20 atmospheres.

2. A process as in claim 1 wherein said catalyst is supported on a carrier.

3. A process as in claim 1 wherein the reaction temperature is from 50° C. to 300° C.

4. A process as in claim 1 wherein the reaction pressure is from 1 to 10 atmospheres.

5. A process as in claim 1 wherein said monochloroparaffin is isopropylchloride.

6. A process as in claim 1 wherein said monochloroparaffin is tert. butyl chloride.

References Cited

UNITED STATES PATENTS

| 2,152,890 | 7/1936 | Kipper. |
| 2,327,174 | 8/1943 | Cass. |
| 3,267,161 | 8/1966 | Ukaji et al. |

FOREIGN PATENTS

| 671,130 | 9/1963 | Canada. |
| 633,643 | 12/1963 | Belgium. |

LEON ZITVER, Primary Examiner

J. A. BOSKA, Assistant Examiner

U.S. Cl. X.R.

260—659